United States Patent [19]

Turgeon

[11] Patent Number: 5,591,073
[45] Date of Patent: Jan. 7, 1997

[54] METHOD AND APPARATUS FOR LAPPING SLIDERS

[75] Inventor: Carol R. Turgeon, Franklin, Mass.

[73] Assignee: Quantum Corporation, Milpitas, Calif.

[21] Appl. No.: 571,660

[22] Filed: Dec. 13, 1995

[51] Int. Cl.⁶ .................................................. B24B 29/02
[52] U.S. Cl. ............................ 451/314; 451/59; 451/505
[58] Field of Search ................................. 451/59, 63, 41, 451/285–288, 312, 313, 314, 494, 495, 390, 5, 505, 504

[56] References Cited

U.S. PATENT DOCUMENTS

| | | | |
|---|---|---|---|
| 3,305,976 | 2/1967 | Koskie | 451/505 |
| 3,448,549 | 6/1969 | McCall | 451/364 |
| 4,206,574 | 6/1980 | Dotsko | 451/495 |
| 5,214,882 | 6/1993 | Rupp | 451/494 |
| 5,365,700 | 11/1994 | Sawada et al. | 451/287 |
| 5,423,716 | 6/1995 | Strasbaugh | 451/287 |
| 5,468,177 | 11/1995 | Kindler et al. | 451/364 |
| 5,486,131 | 1/1996 | Cesna et al. | 451/285 |

FOREIGN PATENT DOCUMENTS 2036068  2/1990  Japan ........................ 451/51

*Primary Examiner*—Robert A. Rose
*Attorney, Agent, or Firm*—David B. Harrison

[57] ABSTRACT

A method and apparatus for lapping the air bearing surfaces of hard disk head sliders including the steps of installing a lapping plate charged with lapping abrasive onto a lapping contour plate, applying a negative pressure to a cavity of the lapping contour plate communicating with the charged lapping plate to deform the lapping plate into conformance with a contour of the lapping contour plate, applying a lapping force to a slider in contact with the lapping plate, and moving the slider relative to the lapping plate to form an air bearing contour following the contour of the lapping contour plate.

12 Claims, 4 Drawing Sheets

TRIMETRIC VIEW
REF. ONLY

| VARIATION CHART | | |
|---|---|---|
| VARIATION | "A" DIMENSION | CROWN |
| 1-A | 1080 RAD. | 0.5 µ" |
| 1-B | 540 RAD. | 1.0 µ" |
| 1-C | 800 RAD. | 0.75 µ" |
| 1-D | 375 RAD. | 1.75 µ" |
| 1-E | 275 RAD. | 2.25 µ" |
| 1-F | 430 RAD. | 1.45 µ" |
| 1-G | 344 RAD. | 1.85 µ" |

& # 1

METHOD AND APPARATUS FOR LAPPING SLIDERS

FIELD OF THE INVENTION

The invention relates generally to disk drives and more particularly to a method and apparatus for forming an air bearing surface of a slider, wherein the air bearing surface defines a predetermined crown geometry with minimal camber.

BACKGROUND OF THE INVENTION

The anatomy of a disk drive, in general, comprises a substantially rectangular housing having a hollow cavity. The cavity is atmospherically sealed and comprises a centrally located spindle motor with at least one magnetic storage disk mounted for rotation thereon. In addition, there is a head stack assembly which essentially positions a flying read/write head transducer carried on a slider over the magnetic storage disk. The slider flies over the disk on a cushion of air created by the rotating disk. The slider is flown over the disk such that an electromagnetic transducing relationship is maintained between the transducer and a magnetic storage medium formed on a facing surface of the disk. Incident to data blocks being written to the disk or read from the disk via the transducer, channel electronics communicates with an external computing environment via an interface.

In order to increase data storage capacity of disk drives, the industry has explored a plurality of options including increasing track densities, increasing flux transition (bit) densities, producing sharper read-back pulses, etc. One enabling common denominator to the aforementioned options is flying sliders at lower relative altitudes over a rotating disk.

Typical sliders comprise a six-sided rectangular shaped ceramic body (e.g. aluminum titanium carbide) having a leading edge, a trailing edge, a pair of side edges extending longitudinally from the leading to the trailing edges, a top surface that is gimbal-mounted to a load beam within a head stack, and an air bearing surface which directly faces the rotating disk during drive operation.

The air bearing surface of the slider body is aerodynamically shaped to essentially fly the slider over the rotating disk in a controlled manner. Generally, the rails of an air bearing surface comprise a distinct planar surface that extends outwardly from the remainder of the air bearing and towards a rotating disk. The rails can be shaped into a plurality of geometries, whereby the desired flying characteristics typically dictate the required geometry. The air bearing further comprises a ramp, or a step, positioned at the leading edge for aiding in relatively fast lift-off as is conventional in contact stop-start operations.

During operation, a slider may be subject to several variables that inhibit the slider to fly in a controlled manner. Specifically, as a head stack assembly moves a slider from inner diameter tracks of the disk to outer diameter tracks of the disk, the linear velocity vector with respect to the slider and disk increases substantially. Furthermore, the linear velocity vector changes direction as the slider traverses the radius of the disk. Therefore, the combined increase in the linear velocity vector and the change in direction of the linear velocity vector cause the slider to fly at a higher relative altitude at the outer disk radial region than at an inner disk radial region.

Ideally, it is desirable to maintain a constant fly height across all disk radii, thereby enabling the slider to fly as low as possible (e.g. 0.5 to 2.0 micro-inches above the average disk surface) without having to account for fly height variations. Thus, a principal constraint in designing air bearing slider surfaces is to dimension and shape the bearing surface such that a constant fly height may be maintained as the slider traverses the disk. Other slider flying characteristics include: pitch, roll, and yaw angle. Pitch is defined as an angle between the air bearing an imaginary line extending tangentially to the disk surface from a trailing edge of the air bearing. Roll is defined as the amount a slider tips laterally as the slider traverses the disk. The yaw angle is an angle between a longitudinal axis of the slider and a data track locus tangent at the slider.

In an effort to maintain a constant fly height, the industry has discovered that crown, which is defined as dimensioning the lengthwise direction of the slider's rails in a convex geometry with respect to the remainder of the air bearing, is virtually immune to angular velocity variations. Thus, a slider that has rails with crown may achieve a flat fly height profile independent of track radii.

However, it is also known that camber, which is a convex rail geometry across the rails, causes detrimental effects such as inconsistent fly height across the disk and increased roll. Therefore, it is desirable to produce sliders with a tightly controlled crown geometry, while minimizing camber.

Currently, crowned air bearing geometries are created by disposing an adhesive on a top surface of the slider (surface opposite to the air bearing surface) such that curing properties of the adhesive exert a deformation force to the slider. This force is sufficient to slightly deform the slider into a second orientation exhibiting crown and minimal camber at the air bearing surface. However, as shown in FIG. 5 hereof, the adhesive is temperature-sensitive and may adaptively change state, thus causing variations in the crown geometry of the air bearing. Slider temperature sensitivity means that a disk drive equipped with a temperature sensitive slider may function satisfactorily until exposed to conditions with temperature variations.

Therefore, with the disk drive industry experiencing technological advances in capacity, in particular maintaining constant flying height as sliders traverse across a rotating magnetic disk, a hitherto unsolved need has remained for a method and apparatus for manufacturing an air bearing with a predefined crown geometry, and minimal camber, and insensitivity to temperature variations.

SUMMARY OF THE INVENTION WITH OBJECTS

An improved method and apparatus for lapping an air bearing surface of a head slider results in a predetermined crown dimension with minimized unwanted camber, in accordance with principles of the present invention.

An advantage of the improved method and apparatus for lapping the air bearing surface of sliders is realized by employing a cylindrically shaped lapping surface and air pressure plenum communicating with the lapping surface to form a predetermined crown dimension on the air bearing surface. At the same time the invention realizes a cylindrically shaped surface that may be restored to a substantially planar surface by removing a negative air pressure exerted thereon. The unpressurized substantially flat lapping plate surface requires minimal resources to recharge and recondition for subsequent lapping operations and usages.

Accordingly, one embodiment of the present invention relies upon a stationary precharged lapping plate that is removably attached and sealed to a contour plate to form a pressure vessel. When a negative air pressure is applied to the pressure vessel, it uniformly deforms the lapping plate into a predetermined desired, substantially concave shape. In addition, the apparatus accepts a lapping fixture in a manner such that the apparatus traverses the lapping fixture over the concavely shaped lapping plate along a predetermined path. In one preferred embodiment of the present invention, the lapping fixture may transverse the lapping plate along a controlled path guided by ranges of movement of lineal and transverse slides. Sliders attached to the lapping fixture are thereby lapped to have air bearing surfaces with predetermined crown dimensions with minimum camber dimensions and without requiring any cured adhesives as per the previous approaches.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 3b is a cross-section of the FIG. 2 contoured lapping plate taken along section line 3b—3b in FIG. 3a.

DETAILED DESCRIPTION OF PREFERRED EMBODIMENTS

Figure 1:
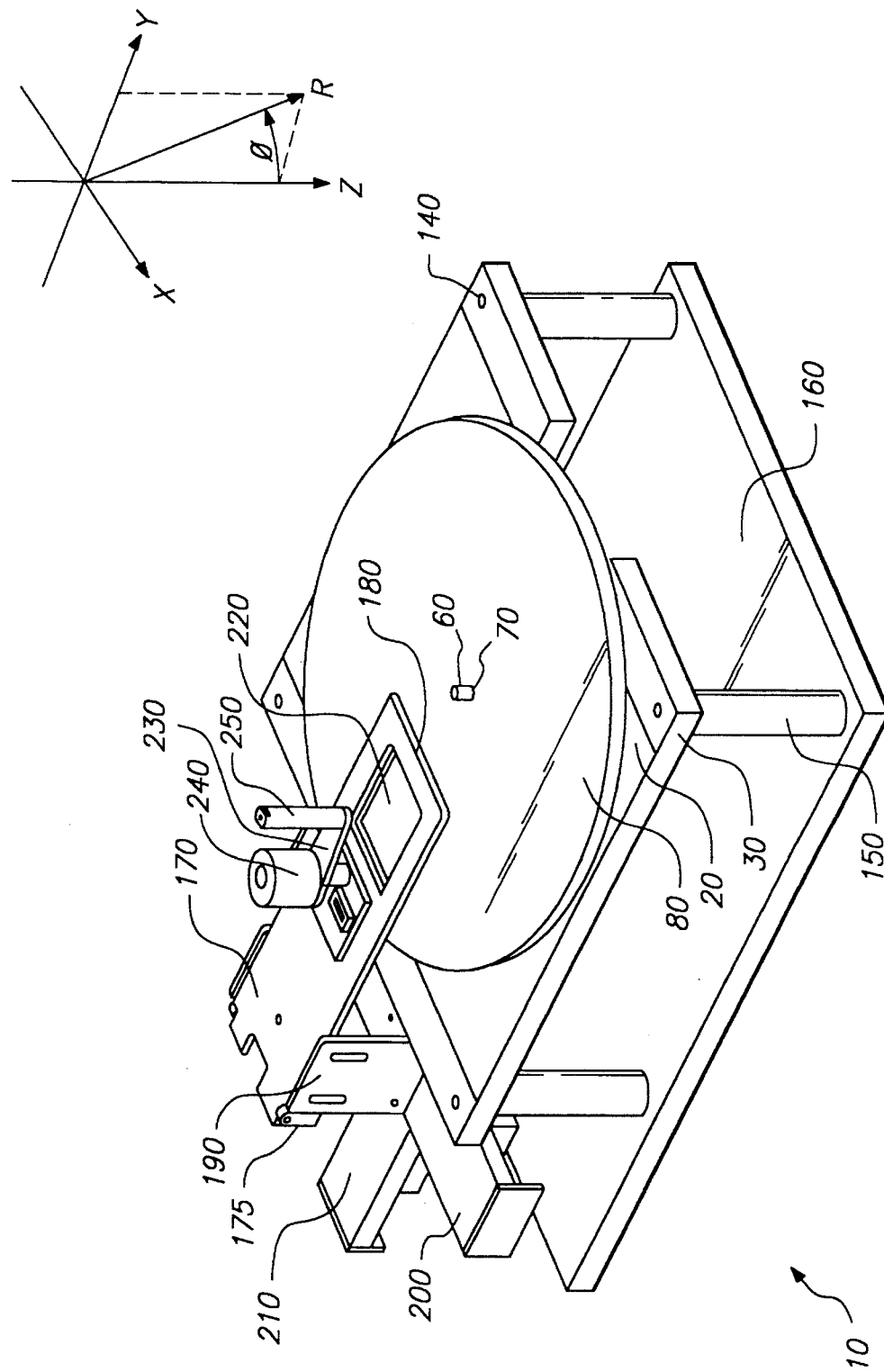
FIG. 1 is an isometric view of a lapping apparatus according to principles of the present invention.
Figures 2, 4:
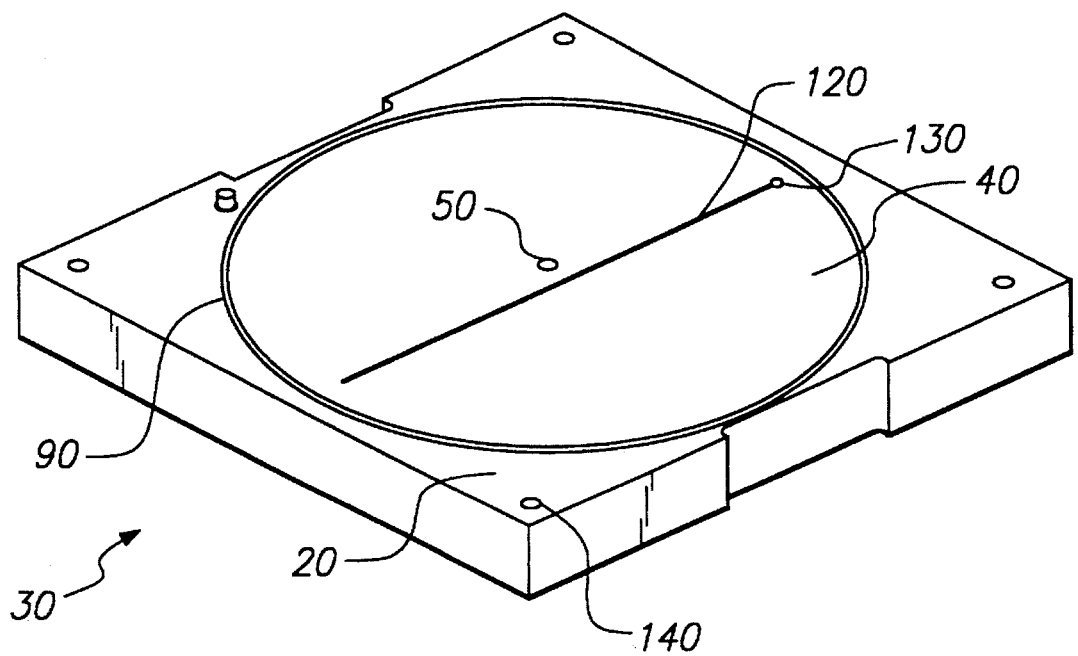
FIG. 2 is an isometric view of a contoured lapping plate within the FIG. 1 lapping apparatus.
FIG. 4 is a table of contoured lapping plate variations that form several preferred lapping plate concavities, which in turn, yield several corresponding slider crown contours.
Figure 3A:
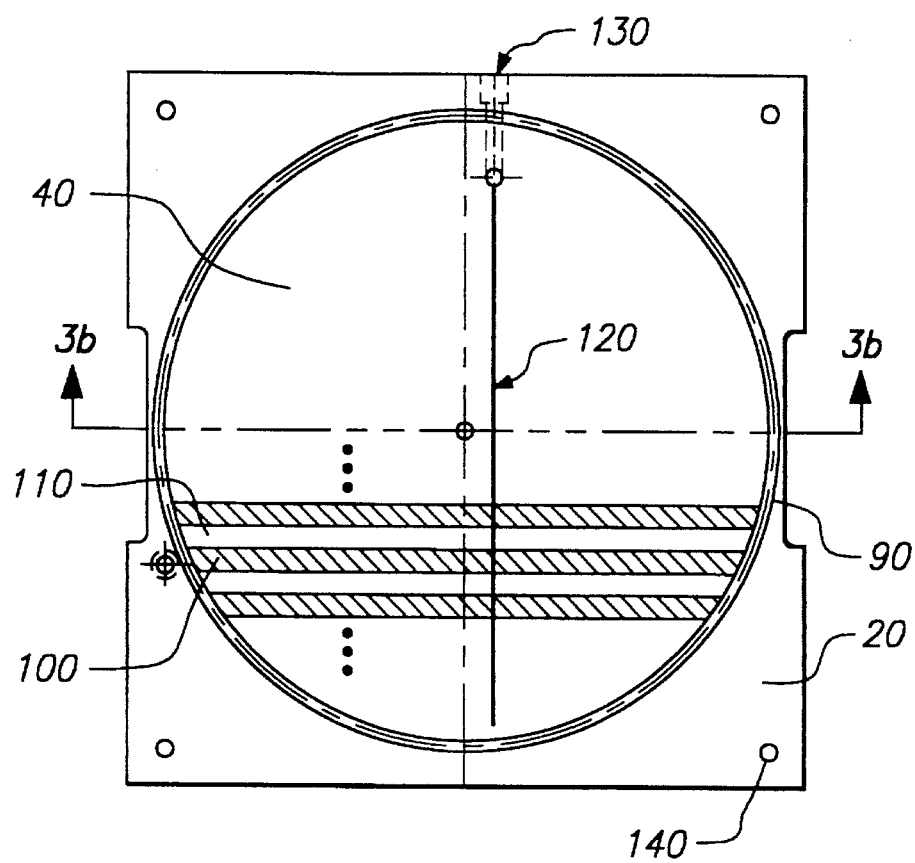
FIG. 3a is a top plan view of the FIG. 2 contoured lapping plate.
Figure 3B:
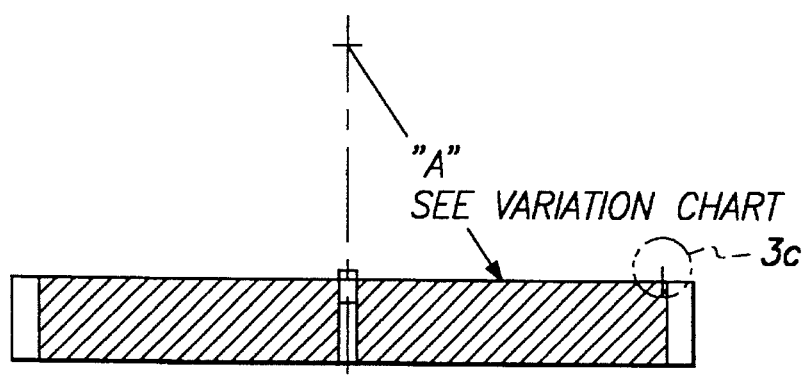
Figure 3C:
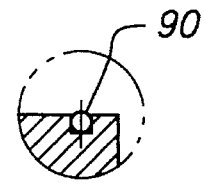
FIG. 3c is an enlarged edge region of the FIG. 3b sectional view, depicting a peripheral seal.
Figure 5:
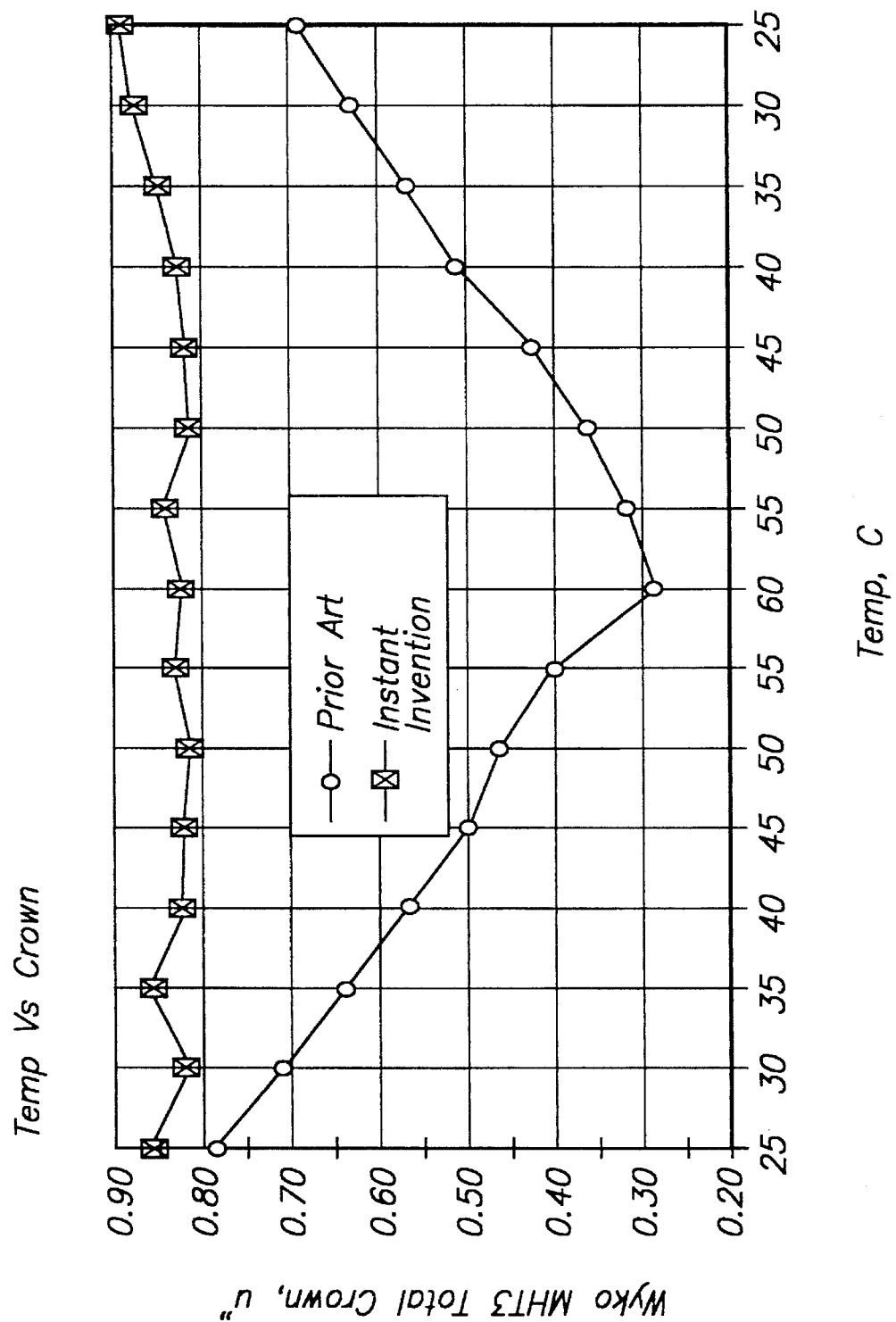
FIG. 5 is a graph plotting the prior art slider crown dimensions that vary as a function of temperature with the same dimensions over the same temperature range of sliders lapped by the FIG. 1 apparatus.

Referring to FIGS. 1, 2, 3a, 3b and 3c, a slider lapping apparatus 10 incorporating principles of the present invention comprises a substantially rectangular lapping plate 30 having a concave top surface 20 and a cylindrical cavity 40. The cavity 40 defines a central bore 50 for receiving a guide pin 60. The guide pin 60 aligns with and extends through a second central bore 70 of a lapping plate 80 charged in a conventional manner with industrial diamond dust abrasive. The lapping plate 80 is positioned over and in a contact relationship with the concave top surface 20 of the contour plate 30, such that a peripheral seal 90 forms an airtight pressure vessel environment within the cavity 40.

A bottom region of the cavity 40 has a plurality of uniformly spaced raised contour ribs 100 separated by a like number of depressions 110. Each of the depressions 110 forms an air flow channel. The air flow channels are each connected to a central air flow channel 120 traversing the bottom region of the cavity 40. The central air channel 120 communicates with a fitting 130 adapted to provide a suitable connection to a negative air pressure source (e.g. vacuum pump) external to the cavity 40.

A negative air pressure applied to the cavity 40 via the fitting 130 deforms the lapping plate 80 downwardly into the cavity 40, until the contour ribs 100 contact the lapping plate 80, thereby causing the lapping plate 80 to have a predetermined concavity contour. The deformation of the lapping plate 80 is limited to a range not greater than a range of elasticity of the lapping plate material. Upon removal of the negative air pressure, the lapping plate 80 returns to an original, substantially planar contour.

The contour plate 30 defines a first set of bores 140 located at outer edge regions and sized to receive a screw therethrough. Each screw extends through the first set of bores 140 and into a second set of threaded bores (not shown) of a plurality of cylindrical plate support members 150, in order to mount the contour plate 30 to the apparatus 10. The opposite ends of the cylindrical plate support members 150 are each attached to a common base 160.

The lapping apparatus 10 further has a cantilevered lapping arm 170 comprised of an elongated flat planar member having a first end 175 and a second end 180. The first end 175 is pivotably connected to an arm support block 190. The arm support block 190 is further connected to a first slide bracket 200 for relative motion along an x-axis. The first slide bracket 200 is also connected to a second slide bracket 210 for relative motion along a y-axis. The first slide bracket 200 and the second slide bracket 210 may be actuated by any suitable actuation means, such as a motor, solenoid, pneumatic or hydraulic cylinder, or the like. By inspection of FIG. 1, it is apparent that the actuated slide brackets 200 and 210 impart a desired lapping movement to the lapping arm 170 and in turn to an installed lapping fixture. The second end 180 of the lapping arm 170 has a rectangular bore 220 therethrough for accepting a lapping fixture of a type described in commonly assigned Kindler U.S. Pat. No. 5,468,177 entitled: "Lapping Fixture for Disk Sliders", the disclosure thereof being incorporated herein by reference.

An air cylinder mount assembly 230, comprising a pivotable cylinder 240 and a load force actuator 250, is positioned intermediately between the first end 175 and the second end 180 of the lapping arm, and exerts a controlled downwardly directed gram load force onto the lapping fixture during operation.

In accordance with principles of the present invention a method comprises the steps of:

installing the lapping plate 80 in contact relationship with the concave top surface 20 of the contour plate 30, applying a negative pressure to the cavity of the lapping contour plate 30 to deform the lapping plate 80 to a predetermined concavity, installing sliders to be lapped into the lapping fixture, setting a gram load force of the air cylinder mount assembly 230 to maintain a predetermined gram load force between the lapping plate and the air bearing surfaces of the sliders to be lapped, spraying a lubricant onto a top surface of the lapping plate 80, installing the lapping fixture into the lapping arm cavity 220 such that the sliders positioned thereon have their air bearing surfaces oriented alike, the lapping fixture being oriented in the cavity 220 such that the rails of the air bearing surfaces of the sliders positioned thereon have a parallel relationship with the raised contour ribs 100 as well as the depressions 110 in the cavity 40 of the contour plate 30;

pivoting the air cylinder mount assembly 230 to a position whereby the load actuator 250 exerts a downwardly directed force onto the lapping fixture, setting a number of lapping strokes of the lapping arm 170 into the apparatus for removing a corresponding number of layers of material from the air bearing surface of the sliders, cycling the apparatus 10 through the predetermined number of lapping strokes, removing the force applied by the load actuator 250 from the lapping fixture, pivoting the air cylinder mount assembly 230;

removing the lapping fixture from the cavity 220 of the lapping arm 170, removing lubricant from the sliders, monitoring abrasive material removal and compensating for wear of lapping plate 80 by adding lapping strokes, removing the negative pressure from the cavity 40 of the lapping contour plate 30, and rotating the lapping plate 80 a predetermined circumferential distance before resuming slider lapping operations.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. An apparatus for lapping a slider comprising:

a lapping contour plate having a concavely contoured top surface, a plurality of contour ribs integrally formed with a base region of the top surface and a plurality of interconnected air channels between the contour ribs, a lapping plate positioned over the top surface and in a contact relationship with the contour plate, whereby the plate is guided into position by a guiding means, an airtight peripheral seal formed between the lapping plate and the top surface of the contour plate, vacuum means for supplying a negative air pressure to the air channels for deforming the lapping plate into the concavely contoured top surface and to contact the plurality of contour ribs so as to form a non-planar desired lapping geometry, an arm structure for receiving, holding, and actuating a lapping fixture including at least one slider to be lapped during lapping operations, and a loading force providing means on the arm structure for engaging the lapping fixture for applying a gram load force to the fixture to urge the slider toward the lapping plate during lapping operations.

2. An apparatus for lapping a slider comprising:

a lapping contour plate having a concavely contoured top surface, a plurality of contour ribs integrally formed with a base region of the top surface and a plurality of interconnected air channels between the contour ribs, a lapping plate positioned over the top surface and in a contact relationship with the contour plate, whereby the plate is guided into position by a guiding means, an airtight peripheral seal formed between the lapping plate and the top surface of the contour plate, vacuum means for supplying a negative air pressure to the air channels for deforming the lapping plate into the concavely contoured top surface and to contact the plurality of contour ribs so as to form a non-planar desired lapping geometry, an arm structure for receiving, holding, and actuating a lapping fixture including at least one slider to be lapped during lapping operations, wherein the lapping is conducted along a path that yields a predetermined crown dimension formed on an air bearing surface of each one of the sliders, and a loading force providing means on the arm structure for engaging the lapping fixture for applying a gram load force to the fixture to urge the slider toward the lapping plate during lapping operations.

3. The apparatus for lapping sliders set forth in claim 1 wherein the guide means comprises a guide pin formed in one of the lapping plate and the contour plate and an aligned recess defined in another of the lapping plate and the contour plate for receiving the guide pin.

4. The apparatus for lapping sliders set forth in claim 3 wherein the lapping plate is substantially circular and includes a central transverse guide pin and the contour plate defines a central recess sized to receive the guide pin and thereby align the lapping plate and to enable the lapping plate to be rotated on the contour plate in the absence of vacuum pressure.

5. The apparatus for lapping sliders set forth in claim 1 wherein the lapping arm further comprises an elongated flat planar member having a first end and a second end, the first end being pivotably connected to an arm support block, wherein the block is further connected to a first slide bracket for enabling relative motion along an x-axis, the first bracket being further connected to a second slide bracket for enabling relative motion along a y-axis, a second end of the lapping arm having a bore for receiving the lapping fixture.

6. The apparatus for lapping sliders set forth in claim 5 wherein the loading force providing means comprises an air cylinder mount assembly positioned intermediately between the first end and the second end of the lapping arm.

7. The apparatus for lapping sliders set forth in claim 6 wherein the lapping arm provides a linear motion to the lapping fixture whereby a plurality of sliders positioned on the lapping fixture may be lapped simultaneously.

8. The apparatus for lapping sliders set forth in claim 7 wherein lapping is conducted along a linear path that yields a predetermined crown dimension formed on an air bearing surface of each one of the sliders.

9. The apparatus for lapping sliders set forth in claim 7 wherein the linear motion of the lapping arm is actuated by a motor connected to the first and second slide brackets.

10. The apparatus for lapping sliders set forth in claim 7 wherein the linear motion is actuated by air pressure being applied to an air cylinder connected to the first and second slide brackets.

11. The apparatus for lapping sliders set forth in claim 7 wherein the lapping arm provides motion to the lapping fixture along at least one lineal path.

12. The apparatus for lapping sliders set forth in claim 1 wherein the lapping contour plate has a cylindrically shaped concave top surface.

* * * * *